Apr. 10, 1923.  
L. B. BUCHNER  
1,451,532  
CONVERTIBLE BABY CRIB AND SEAT FOR AUTOMOBILES  
Filed Dec. 6, 1921  3 sheets-sheet 1

INVENTOR  
Louis B. Buchner  
BY  
Frantzen and Richards  
ATTORNEYS

Apr. 10, 1923.
L. B. BUCHNER
1,451,532
CONVERTIBLE BABY CRIB AND SEAT FOR AUTOMOBILES
Filed Dec. 6, 1921
3 sheets-sheet 2
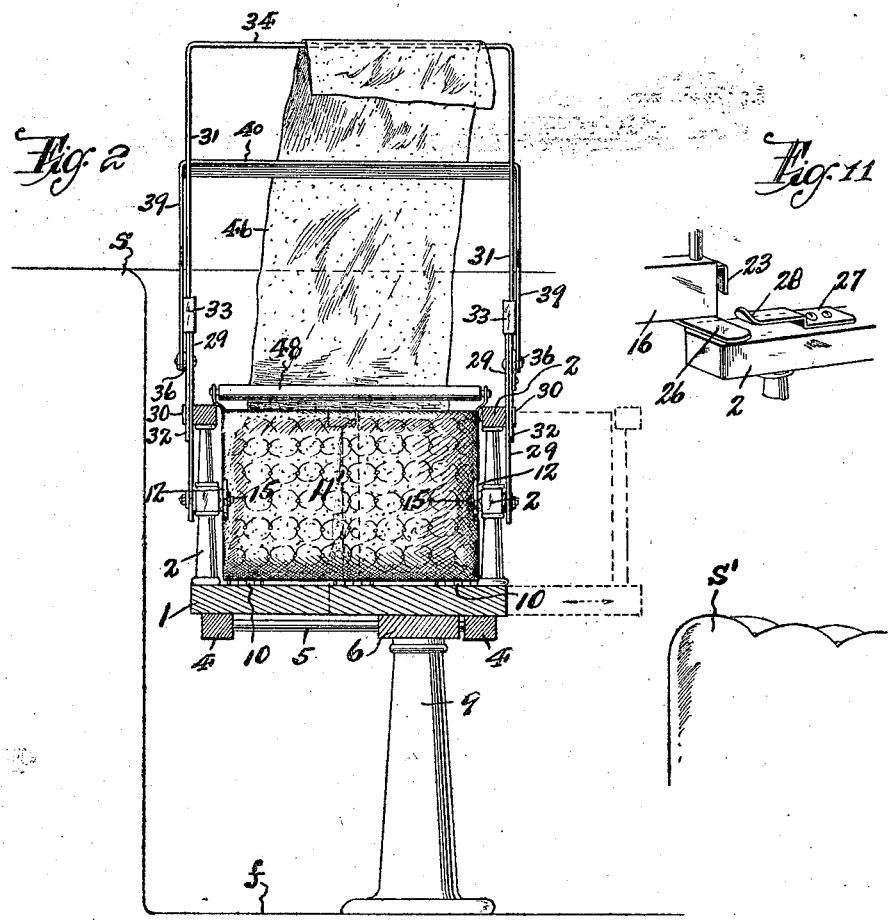
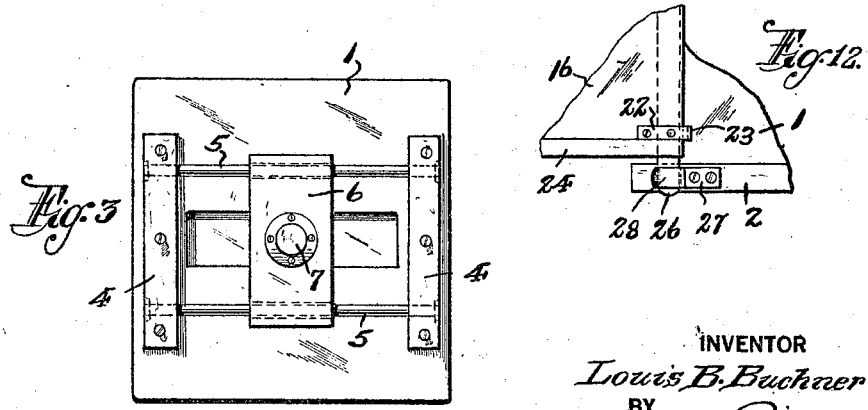
INVENTOR
*Louis B. Buchner*
BY
*Frantz and Richards*
ATTORNEYS

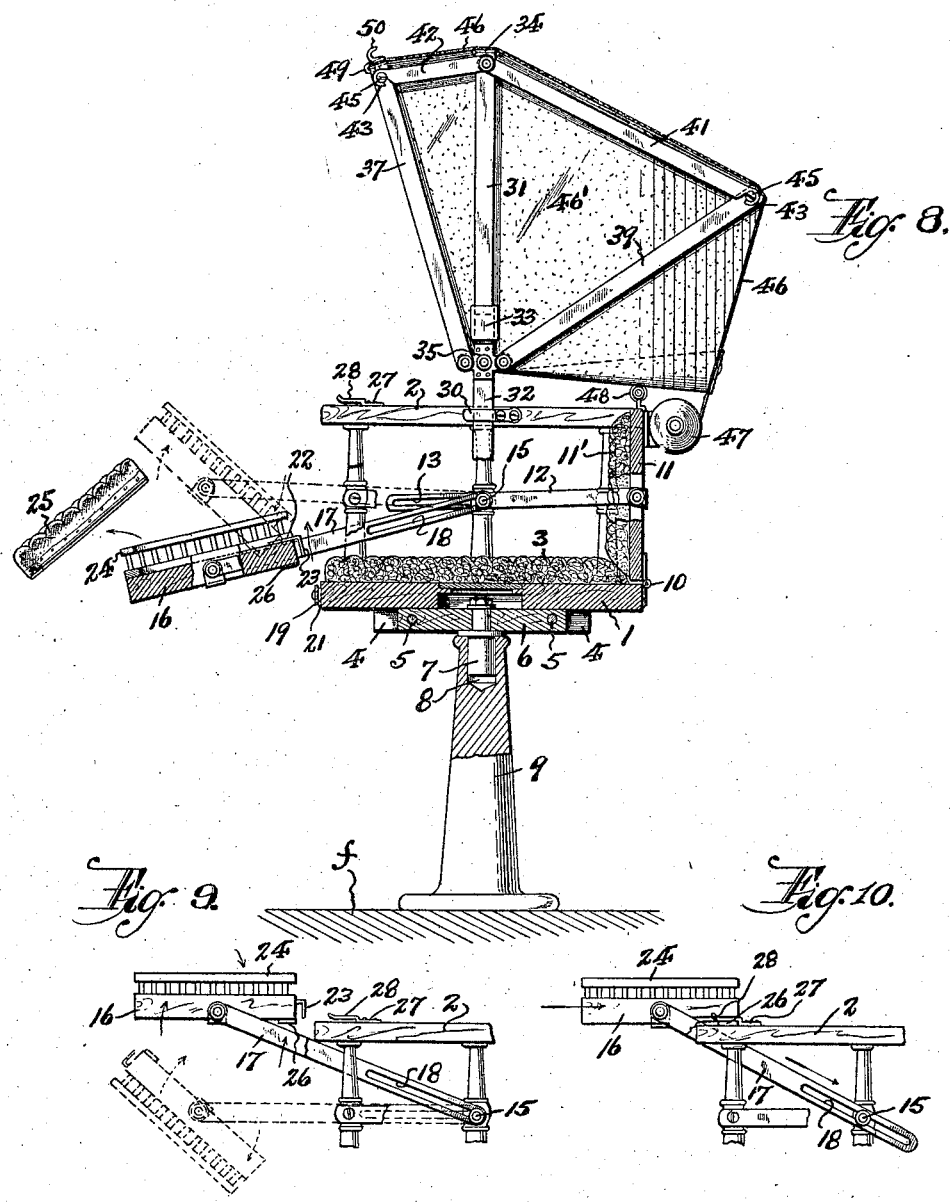

Patented Apr. 10, 1923.

1,451,532

UNITED STATES PATENT OFFICE.

LOUIS B. BUCHNER, OF CALDWELL, NEW JERSEY.

CONVERTIBLE BABY CRIB AND SEAT FOR AUTOMOBILES.

Application filed December 6, 1921. Serial No. 520,259.

*To all whom it may concern:*

Be it known that I, LOUIS B. BUCHNER, a citizen of the United States, residing at Caldwell, in the county of Essex and State of New Jersey, have invented certain new and useful Improvements in Convertible Baby Cribs and Seats for Automobiles; and I do hereby declare the following to be a full, clear, and exact description of the invention, such as will enable others skilled in the art to which it appertains to make and use the same, reference being had to the accompanying drawings and to characters of reference marked thereon, which form a part of this specification.

This invention relates, generally, to an improved construction of convertible baby-crib and seat for automobiles and similar vehicles; and the invention has reference, more particularly, to a novel construction of foldable, adjustable, and convertible baby-crib and seat together with a novel means for mounting the same in the tonneau of an automobile.

The invention has for its principal object to provide a novel arrangement and construction of baby-crib which may be readily converted into a seat or chair for the baby, and which is constructed to fold up into a comparatively compact bulk when not in use; and, furthermore, the invention seeks to provide a novel means for mounting and supporting the structure within the tonneau of an automobile in such a manner as to economize space and not interfere with foot room, and yet so as to provide for an easy manipulation of the device to most conveniently position the same for use.

Other objects of this invention, not at this time more particularly enumerated, will be clearly understood from the following detailed description of the same.

With the various objects of this invention in view, the same consists, primarily, in the novel construction of convertible baby-crib and seat for automobiles hereinafter set forth; and, the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 1 is a side elevation of the novel convertible baby-crib and seat unfolded and disposed to provide a crib; Figure 2 is a transverse section of the same, showing the means for mounting the same, and the relation of the same to the interior of the tonneau of an automobile; Figure 3 is a detail bottom view of the main body portion; Figure 4 is a fragmentary plan view of the foot rest as operatively arranged to form a part of the crib arrangement; Figure 5 is a perspective view of a stay for connecting the foot-rest with the main body portion; Figure 6 is a fragmentary longitudinal section and Figure 7 is a fragmentary perspective of a coupling means for holding the foot-rest portion detachably connected with the main body portion; Figure 8 is a part side elevation and part section of the convertible structure as arranged to provide a baby chair or seat; Figures 9 and 10 are detail fragmentary side views showing the method of converting the foot-rest into a play tray and operatively coupling the same with the sides of said main body portion when so arranged; Figure 11 is a fragmentary perspective of the tray coupling devices; and Figure 12 is a fragmentary plan view of the tray coupling devices in coupled relation.

Similar characters of reference are employed in all of the hereinabove described views, to indicate corresponding parts.

Referring to said drawings, the reference character 1 indicates the main body of the novel convertible baby-crib and seat, the same having suitably constructed side portions 2 connected therewith, and also having, if desired, its upper surface padded by suitable upholstery 3. Secured to the under side of said main body 1 are a pair of laterally opposed longitudinally extending battens 4, which serve to support or carry a pair of slide rods 5. Said slide rods 5 extend slidably through a base-block 6. thus slidably relating said main body 1 to said base-block for lateral movement thereon. Secured to the underside of said base-block is a depending vertical shank or journal 7 which is mounted for rotation in a bearing socket 8 provided in a pedestal 9 which serves to support said base-block and the main body connected therewith.

Said pedestal 9 is suitably secured to the floor $f$ of the tonneau of an automobile intermediate the back of the front seat $s$ and forward of the rear seat $s'$ (see Figure 2). The single pedestal 9 which supports the main body and parts of the baby-crib and seat, when disposed within the tonneau of an automobile in the manner above described, offers little obstruction to the feet of persons sitting on the rear seat $s'$, and permits the feet of said person to have access to the space beneath the baby-crib or seat on either side of said pedestal. By reason of the slidable relation of the main body 1 to the base-block 6, it is possible to either push the baby-crib and seat forward against the back of the front seat $s$ (as shown by the full lines in Figure 2), or to pull the same toward the rear seat $s'$ (as shown by the dotted lines in said Figure 2). In the latter position an occupant of the rear seat $s'$ may move the baby-crib and seat conveniently to hand, so that the baby occupying the latter may be conveniently given such attention as it may require by said rear seat occupant without necessity for the latter person to rise from the rear seat, or assume an uncomfortable forward leaning position therefrom while attending to the baby. Furthermore, since the base-block 6 is supported by the shank or journal 7, which is rotatably related to the pedestal 9, it follows that the baby crib or seat may be easily turned about to face to either the right or left hand, consequently enabling the baby-crib or seat to be most advantageously positioned for adequate protection against sunlight and wind, as will be understood.

Pivotally connected with the rear end of said main body 1, by hinges 10 or other suitable means is an adjustable back-member 11, which may be provided with suitable upholstery 11' if desired. Pivotally connected with the sides of said back-member 11 are stays 12, which are provided adjacent to their free ends with longitudinal slots 13. Associated with the inner or rearward ends of said slots 13 are stop-notches 14 extending at substantially right angles to the said slots. Said stays 12 extend forwardly from said back-member 11, and have their slots 13 operatively engaged with stop-studs 15, which are attached to and extend inwardly from the sides 2 of said main body 1. As will be apparent from an inspection of the drawings, when it is desired to position the back-member 11 in downwardly swung disposition, in arranging the device to serve as a crib, the stays 12 are slid outwardly until the outer ends of the slots 13 are stopped against the stop-studs 15, thus supporting said back-member in lowered position to form the head of a crib support. When, however, it is desired that the back-member be raised to upright position, to serve in conjunction with the main body as a seat or chair, whereby the back-member functions as the back of said seat or chair, the same is raised or swung upwardly, thus moving inward the stays 12 until the stop-notches 14 drop over the stop-studs 15, thereby engaging and interlocking the stays 12 in such relation to the stop-studs 15 that the back member is retained against accidental displacement from desired upright position.

The reference character 16 indicates a member which serves as a convertible footrest and tray, which is capable of being so disposed relative to the front end of said main body 1 as to form either a foot-rest when the device is arranged as a crib, or a play tray when the device is arranged as a seat or chair. The means for thus adjustably attaching the member 16 to the main body comprises a pair of stays 17, which are respectively pivotally connected with the respective sides of said member 16 intermediate the ends of the same. Said stays are provided with longitudinal slots 18 adjacent to their free ends, which slots are also engaged with said stop-studs 15 connected with the sides 2 of said main body 1. Connected with the front edge of said main body 1 is a transverse bar 19 which is off-set from said front edge of the main body 1 by spacing blocks 20, thereby providing intermediate the bar 19 and the edge of said main body a receiving socket or space 21. Secured to the rearward edge of said member 16 are a pair of rearwardly projecting coupling members 22, having at their free ends downwardly projecting hook-portions 23 which are off-set from said rearward edge of said member 16. When the member is to be disposed in horizontal extension from the main body 1, so as to lie substantially in the horizontal plane of said main body, in which position it is adapted to serve as a foot-rest for the device arranged to function as a crib, the hook-portions 23 are entered in the receiving socket or space 21 so as to be engaged over the bar 19, thus holding the member 16 coupled to the main body 1 and supported against downward collapse by said stays 17, in which position, the outer ends of the slots 18 of said stays 17 are in stopped engagement with the stop-studs 15. The said member 16 if desired is provided at its side and front marginal portions with an upwardly projecting flange 24. A removable cushion or pad 25 may be provided to fit within said flange 24 if desired. When the member 16 is to be disposed so as to serve as a play-tray for the device arranged to function as a seat or chair, the hook-portions 23 are disengaged from the bar 19, and the member 16 is then rotated upon the ends of the stays 17, while at the same time said stays are swung upwardly (see Figures 8, 9, and 11) to raise the member 16 upwardly to the plane of the top edges of said sides 2 of the main body 1. Secured to the under side of said member 16, at the rearward corners thereof, are laterally and outwardly projecting lugs 26. Secured upon the upper edges of said sides 2 of the main body 1, and somewhat rearwardly spaced from the forward ends of said sides, are retaining clips 27 having upwardly off-set portions 28. When the member 16 is raised to the level of the tops of said sides 2, the same is given a rearward movement which carries the lugs 26 beneath the off-set portions 28 of the retaining clips 27, so that the member is engaged with and supported from the forward upper portions of the sides 2 of the main body 1, in which positions the stays 17 incline downwardly and shift inwardly relative to said stop-studs 15 (all as indicated in Figures 10 and 12 of the drawings). It will be apparent that the member 16, when thus positioned, serves admirably as a support or tray, disposed in front of a child seated in the chair or seat, upon which it may play with toys or other articles afforded for its amusement.

From the above description it will be clearly evident, that this invention provides a novel convertible baby-crib or seat, which affords a very convenient and comfortable means for supporting and caring for a baby or small child when traveling in automobiles, and yet the device is so arranged, that it offers little inconvenience to the feet of the rear seat occupants of the automobile equipped therewith, since the same is supported by a single pedestal or standard. The adjustability of the device upon the pedestal support whereby the same may be turned to face either the left or right, and whereby the same may be drawn toward the rear seat of the automobile, so that an occupant of said rear seat can readily have access to the device and the baby occupying the same are novel features of great convenience. Furthermore, the collapsible nature of the device whereby its bulk may be greatly reduced when not in use is of considerable advantage, since it offers little interference to the passengers when entering and leaving the automobile.

I am aware that some changes may be made in the arrangements and combinations of the various devices and parts as well as in the details of the construction of the same, without departing from the scope of my present invention as set forth in the foregoing specification and as defined in the appended claims. Hence, I do not limit my invention to the exact arrangements and combinations of the various parts as described in said specification, nor do I confine myself to the exact details of the construction of the said parts as illustrated in the accompanying drawings.

I claim:—

1. In a device of the kind described, a pedestal, a base-block, a vertical shank depending from said base-block, said pedestal having a bearing socket in its upper end to receive said shank whereby said base-block is mounted on said pedestal to swivel in horizontal plane, a horizontal support, laterally spaced longitudinal battens fixed to the bottom of said support, a pair of parallel spaced apart slide-rods fixed to and extending between said battens, and said base-block having transverse slideways through which said slide-rods extend and move to render said support transversely slidable relative to said base-block.

2. In a device of the kind described, a horizontal bottom body having fixed upright sides, means for supporting said bottom body, an adjustable back-member connected with the rear end of said bottom body movable to either upright or substantially horizontal position, a convertible member providing either a foot-rest or tray, stays pivotally connected with the sides of said convertible member, the inner ends of said stays having longitudinal slots therein, pivot studs projecting outwardly from said upright sides of said bottom body intermediate their upper and lower ends with which said slotted ends of said stays are engaged, cooperative means on the rear edge of said convertible member and the forward edge of said bottom body for coupling the former in foot-rest relation to the latter, and additional cooperative means on the rearward portion of the sides of said convertible member and the forward portion of the upright sides of said body member for coupling said convertible member in tray relation to the latter.

3. In a device of the kind described, a horizontal bottom body having fixed upright sides, means for supporting said bottom body, an adjustable back-member connected with the rear end of said bottom body movable to either upright or substantially horizontal position, a convertible member providing either a foot rest or tray, stays pivotally connected with the sides of said convertible member, the inner ends of said stays having longitudinal slots therein, pivot studs projecting outwardly from said upright sides of said bottom body intermediate their upper and lower ends with which said slotted ends of said stays are engaged, an off set coupling bar fixed to the forward edge of said bottom-body, coupling hooks fixed to the rearward end of said convertible member to engage said coupling bar when positioning said convertible member in foot-rest position, retaining clips fixed upon the forward portions of the upper edges of said upright sides of said bottom body, and laterally projecting lugs fixed to the rearward corners of said convertible member to engage said retaining clips when positioning said convertible member in tray position.

In testimony, that I claim the invention set forth above I have hereunto set my hand this 26th day of November, 1921.

LOUIS B. BUCHNER.

Witnesses:
GEORGE D. RICHARDS,
EVA E. DESCH.